United States Patent [19]

Okamoto et al.

[11] 4,114,033
[45] Sep. 12, 1978

[54] BAR CODE INFORMATION CARD

[75] Inventors: Atutoshi Okamoto, Toyohashi; Tadao Nojiri; Masahiro Nomura, both of Kariya, all of Japan

[73] Assignee: Nippondenso Co., Ltd., Kariya, Japan

[21] Appl. No.: 765,753

[22] Filed: Feb. 4, 1977

[30] Foreign Application Priority Data

Feb. 18, 1976 [JP] Japan .................. 51-18043[U]

[51] Int. Cl.² .................. G06K 19/06
[52] U.S. Cl. .................. 235/494
[58] Field of Search .................. 235/61.12 N, 61.12 R, 235/61.11 E, 487, 494; 340/146.3 Z, 146.3 F; 250/569

[56] References Cited

U.S. PATENT DOCUMENTS

| 3,663,802 | 5/1972 | Wildhaber | 235/61.12 N |
| 3,673,389 | 6/1972 | Kapsambelis et al. | 235/61.12 N |
| 3,674,990 | 7/1972 | Kurauchi et al. | 235/61.12 N |
| 3,711,683 | 1/1973 | Hamisch, Sr. | 235/61.12 N |

Primary Examiner—Daryl W. Cook
Attorney, Agent, or Firm—Cushman, Darby & Cushman

[57] ABSTRACT

A great number of bar codes are recorded in dual directions on a bar code information card. Each bar code is comprised of a plurality of bar symbols juxtaposed in parallel to each other. A plurality of bar codes, constituting one group bar code, are arranged in one direction which is orthogonal to the bar symbol and a plurality of group bar codes are arranged in the other direction in which the bar symbol extends. A great deal of bar-coded information is recognized by transferring the bar code information card in the longitudinal direction of the bar symbol and scanning the bar code orthogonally thereto.

9 Claims, 1 Drawing Figure

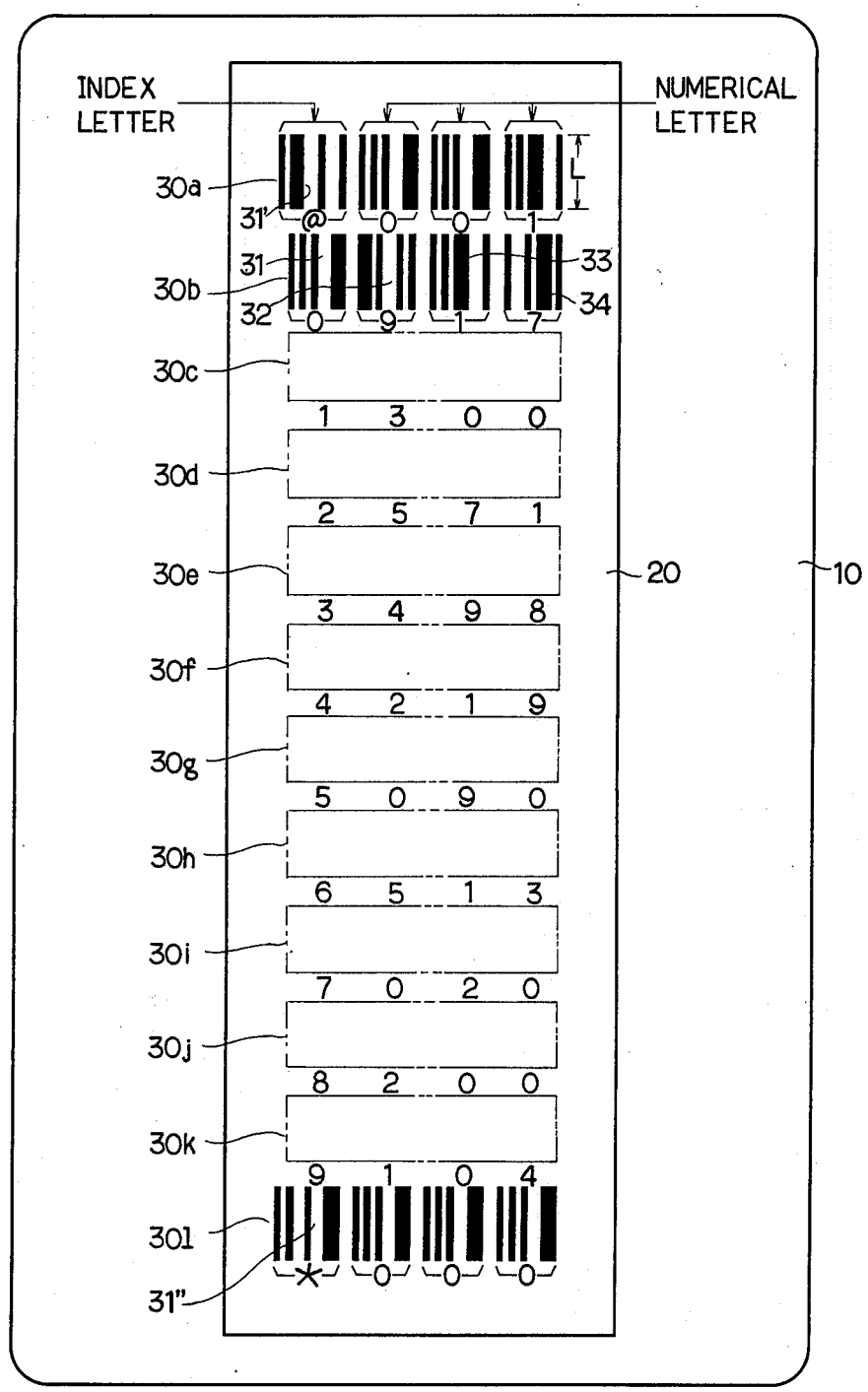

BAR CODE INFORMATION CARD

CROSS-REFERENCES TO RELATED APPLICATION

This application is related to the following United States patent application which has been assigned to the same assignee as this application.

Ser. No. 668,036 entitled "Method and Apparatus to Read in Bar-coded Information" filed on Mar. 18, 1976.

BACKGROUND OF THE INVENTION

The present invention relates to a bar code information card on which a great number of bar codes are recorded in dual directions which are vertical from each other.

Information encoding and decoding techniques are well known in the prior art techniques. For example, information is encoded into a bar code which is comprised of a plurality of bar symbols of different light reflectivity and all these bar symbols are juxtaposed in parallel to each other on a bar code information card. According to this encoding technique, the bar code information card inevitably becomes too lengthy when a great deal of information is required to be recorded thereon.

SUMMARY OF THE INVENTION

It is therefore a primary object of this invention to provide a bar code information card which is compact and carries a great deal of information.

It is another object of this invention to provide a bar code information card on which a plurality of bar codes are recorded in both column and row directions thereof.

It is a further object of this invention to provide a bar code information card which carries a plurality of bar codes on the longitudinal central region thereof.

BRIEF DESCRIPTION OF THE DRAWING

The sole FIGURE is an enlarged top plan view of a bar code information card according to this invention.

DETAILED DESCRIPTION OF THE PREFERRED EMBODIMENT

Referring to the accompanying drawing, reference numeral 10 designates a card body which is shaped into an oblong form and has a central belt 20.

This central belt 20 extends longitudinally on the central surface of the card body 10 to designate recording region on which bar code information is recorded. A plurality of bar codes are grouped to constitute a plurality of group bar codes 30a through 30l which are parallelly aligned to each other and spaced by a constant width from each other. Each group bar code is comprised of four bar codes 31 through 34 which are parallelly aligned to each other and spaced by a constant width from each other. The left side bar code in each group bar code represents index bar code (index letter) which is indicative of the group number, whereas remaining three bar codes in each group bar code represent numerical bar codes (numerical letters) which carry various information. Taking the group bar code 30b into consideration, the left side bar code 31 represents the index letter and the remaining bar codes 32 through 34 represent the numerical letters. It should be understood therefore that the arrangement of the index bar codes among information cards are identical and the arrangement of numerical bar codes thereamong differs from each other.

The above-described code consists of seven bar symbols of the unit length L. Among seven bar symbols, four black bar symbols and three white bar symbols are used so that each bar code can start with the black bar symbol and end with the black bar symbol. One wide bar symbol in white and one wide bar symbol in black among seven bar symbols are used so that information can be encoded according to the well-known "2 OUT OF 7 COMBINATION". The wide bar symbol is 2.5 times wider than the narrow bar symbol. The bar symbols in each bar code are juxtaposed with their heads and tails lining up in the direction along which bar codes are grouped. Spaces between adjacent bar codes in one group are made as wide as the wide bar symbol so that one bar code can be distinguished from the other bar codes.

It should be noticed herein that the uppermost group bar code 30a and the lowermost group bar code 30l respectively include at the left side thereof specific index bar codes 31' and 31" which are excluded from the "2 OUT OF 7 COMBINATION". These specific index bar codes 30' and 31" include two wide bar symbols in white contrary to the other bar codes which include only one wide bar symbol in white.

The bar code information card according to this invention, as described hereinabove, carries a great deal of bar code information because a plurality of bar codes are arranged in the direction orthogonal to the longitudinal direction of the belt 20 to constitute a group bar code and because a plurality of group bar codes are arranged in the longitudinal direction of the belt 20.

The above-described bar code information card is useful for bar code recognition systems adapted to scan the bar codes orthogonally to the card transfer direction. One of these recognition systems is disclosed in the United States patent application Ser. No. 668,036 which has been recited in the preceding CROSS-REFERENCES TO RELATED APPLICATION. Therefore only an abstractive explanation with regard to bar code scanning is made hereinunder.

While the card 10 is transferred under the scanner of a recognition system in the longitudinal direction of the central belt 20 along which each bar symbol extends, the group bar codes 30a through 30l are sequentially scanned for the recognition thereof. At the first stage of the card transfer, the uppermost group bar code 30a is operatively coupled to the scanner and four bar codes are sequentially scanned from the left side bar code to the right side bar code in such a manner as the scanning direction becomes orthogonal to the longitudinal direction of the bar symbols. At the second stage where the following group bar code 30b is operatively coupled to the scanner due to further transfer of the card 10, the group bar code 30b is scanned in the same manner as the group bar code 30a. Thus scanning the bar codes during the card transfer, the lowermost group bar code 30l is scanned at the last stage to result in the termination of the bar code scanning. Storing scanned data which are sequentially derived from the scanner, a great deal of bar code information recorded on the card 10 can be recognized.

The bar code information card according to the present invention has following advantages. Firstly, the scanner of a recognition system is made compact because a plurality of bar codes are grouped. Secondly, bar codes seldom deviate from the scanning range of the scanner because the bar codes are aligned on the central belt of the card. Thirdly, card transfer direction can be discriminated because each card is recorded with the specific index bar codes at the top and the last groups of bar codes.

We claim:

1. A machine readable bar code information card comprising:
   a card body which substantially has a uniform width;
   a plurality of bar codes aligned parallelly to each other in a direction which is orthogonal to the longitudinal direction of said card body to constitute a group bar code, each bar code in said group bar code having a plurality of bar symbols which parallelly extend in the longitudinal direction of said card body and are in uniform length in different color and width; and
   a plurality of group bar codes aligned parallelly to each other to form a recorded region which extends centrally in the longitudinal direction of said card body.

2. A machine readable bar code information card as claimed in claim 1, wherein said bar codes in each group bar code are spaced from each other by a first constant width, and wherein said group bar codes are spaced from each other by a second constant width.

3. A machine readable bar code information card as claimed in claim 1, wherein said group bar codes include respective index bar codes indicative of the group number at one side thereof.

4. A machine readable bar code information card as claimed in claim 3, wherein said index bar codes in the first and the last group bar codes among said a plurality of group bar codes have at least three wide bar symbols, and wherein said index bar codes in the remaining group bar codes have a fewer number of wide bar symbols than said index bar codes of the first and the last group bar codes.

5. A machine readable bar code information card as claimed in claim 1, wherein said group bar codes include a constant number of bar codes, and wherein the number of said group bar codes is more than that of said bar codes included in one group bar codes.

6. A machine readable bar code information arrangement comprising:
   a body;
   a plurality of bar codes arranged side by side on said body in a first direction to constitute a group bar code, each of said plural bar codes having seven bar symbols arranged side by side in said first direction, said seven bar symbols being recorded in first and second colors alternately and in first and second widths such that two of said seven bar symbols in respective first and second colors are in said first width and the remaining five of said seven bar symbols are in said second width; and
   a plurality of group bar codes arranged parallelly to each other on said body in a second direction which is substantially orthogonal to said first direction.

7. A machine readable bar code information arrangement as claimed in claim 6, wherein said first and second colors are contrasting in light reflectivity, and wherein said first width is 2.5 times wider than said second width.

8. A machine readable bar code information arrangement as claimed in claim 7, wherein the number of said bar codes in each of said group bar codes is smaller than the number of said group bar codes.

9. A machine readable bar code information arrangement comprising:
   a body;
   a plurality of index bar codes arranged in parallel with each other on said body in the longitudinal direction of said body, each of said index bar codes having seven bar symbols recorded side by side in black and in white alternately in a direction orthogonal to the longitudinal direction of said body, three and four bar symbols in the first and last of said index bar codes being recorded in respective wide and narrow widths, and two and five bar symbols in the other of said index bar codes being recorded in respective wide and narrow widths such that the other of said index bar codes represent numerical information in decimal integer order;
   a plurality of numerical bar codes arranged side by side with each of said index bar codes in the direction orthogonal to the longitudinal direction of said body, each of said numerical bar codes having seven bar symbols recorded side by side in black and in white alternately in the same direction with the seven bar symbols of said index bar codes, and two and five bar symbols in each of said numerical bar codes being recorded in respective wide and narrow widths such that said numerical bar codes represent numerical information which is not in decimal integer order.

* * * * *